United States Patent [19]

Edington et al.

[11] Patent Number: 4,982,374
[45] Date of Patent: Jan. 1, 1991

[54] METHOD OF SOURCE CODING AND HARMONIC CANCELLATION FOR VIBRATIONAL GEOPHYSICAL SURVEY SOURCES

[75] Inventors: B. Leon Edington; Tawassul A. Khan, both of Houston, Tex.

[73] Assignee: Halliburton Geophysical Services, Inc., Dallas, Tex.

[21] Appl. No.: 425,798

[22] Filed: Oct. 23, 1989

[51] Int. Cl.$^5$ ............................................. G01V 1/00
[52] U.S. Cl. .......................................... 367/48; 367/41
[58] Field of Search ........................... 367/41, 48, 49; 181/111

[56] References Cited

U.S. PATENT DOCUMENTS

| | | | |
|---|---|---|---|
| 3,885,225 | 5/1975 | Anstey et al. | 367/41 |
| 4,042,910 | 8/1977 | Rietsch | 181/113 |
| 4,168,485 | 9/1979 | Payton et al. | 367/41 |
| 4,715,020 | 12/1987 | Landrum | 367/38 |
| 4,751,687 | 6/1988 | Christensen | 367/22 |
| 4,823,326 | 4/1989 | Ward | 367/41 |

OTHER PUBLICATIONS

The Effect of Harmonic Distortion in the Use of Vibratory Surface Sources, Seriff & Kim, Geophysics, 35 234–246 (Apr. 1970).
New Developments in Vibroseis Technology, Schrodt & Kumamoto, Expanded Abstracts with Biographics, 1985 Technical Program, 55th Annual International SEG Meeting, Washington, D.C.
Simultaneous Recording of Several Vibroseis Lines, Garotta, CGG Technical Series No. 531.83.07 (1983).
Reduction of Harmonic Distortion in Vibratory Source Records, Rietsch, Geophysical Prospecting, 1981, 29 178–188.

Primary Examiner—Ian J. Lobo
Attorney, Agent, or Firm—David J. Alexander; Hilary E. Pearson

[57] ABSTRACT

A method is provided for significantly reducing the distortion and crossfeed from any selected order harmonic for any number of vibratory seismic sources operated concurrently, at the same time providing for separation of the signals from the different sources and for improving the signal-to-noise ratio. After determining the highest order harmonic likely to cause distortion, a number of sweeps of each source in each position is selected. This number depends upon the number of sources and the highest order harmonic to be suppressed. Initial phase angles for each sweep of each source are then selected to permit signal separation while suppressing harmonics up to and including that highest order harmonic.

8 Claims, 1 Drawing Sheet

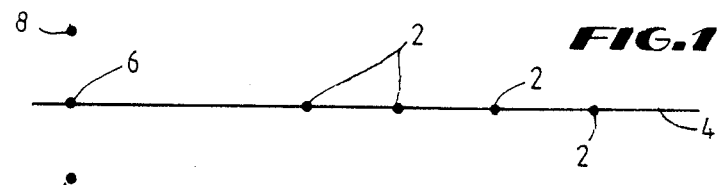
FIG.1
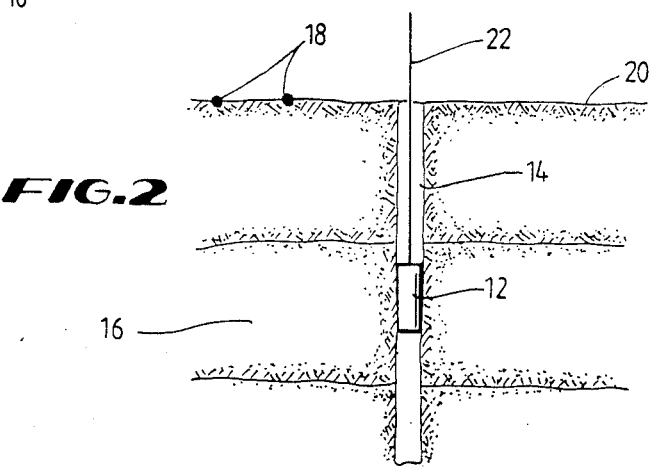
FIG.2
FIG.3
| | | | | | | | | M | | | | | | | | |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| | 0 | 0 | 0 | 0 | 0 | 0 | 0 | 0 | 0 | 0 | 0 | 0 | 0 | 0 | 0 | 0 | 0 |
| | 1 | 0 | 1 | 2 | 3 | 4 | 5 | 6 | 7 | 8 | 9 | 10 | 11 | 12 | 13 | 14 | 15 |
| | 2 | 0 | 2 | 4 | 6 | 8 | 10 | 12 | 14 | 0 | 2 | 4 | 6 | 8 | 10 | 12 | 14 |
| | 3 | 0 | 3 | 6 | 9 | 12 | 15 | 2 | 5 | 8 | 11 | 14 | 1 | 4 | 7 | 10 | 13 |
| | 4 | 0 | 4 | 8 | 12 | 0 | 4 | 8 | 12 | 0 | 4 | 8 | 12 | 0 | 4 | 8 | 12 |
| | 5 | 0 | 5 | 10 | 15 | 4 | 9 | 14 | 3 | 8 | 13 | 2 | 7 | 12 | 1 | 6 | 11 |
| | 6 | 0 | 6 | 12 | 2 | 8 | 14 | 4 | 10 | 0 | 6 | 12 | 2 | 8 | 14 | 4 | 10 |
| H | 7 | 0 | 7 | 14 | 5 | 12 | 3 | 10 | 1 | 8 | 15 | 6 | 13 | 4 | 11 | 2 | 9 |
| | 8 | 0 | 8 | 0 | 8 | 0 | 8 | 0 | 8 | 0 | 8 | 0 | 8 | 0 | 8 | 0 | 8 |
| | 9 | 0 | 9 | 2 | 11 | 4 | 13 | 6 | 15 | 8 | 1 | 10 | 3 | 12 | 5 | 14 | 7 |
| | 10 | 0 | 10 | 4 | 14 | 8 | 2 | 12 | 6 | 0 | 10 | 4 | 14 | 8 | 2 | 12 | 6 |
| | 11 | 0 | 11 | 6 | 1 | 12 | 7 | 2 | 13 | 8 | 3 | 14 | 9 | 4 | 15 | 10 | 5 |
| | 12 | 0 | 12 | 8 | 4 | 0 | 12 | 8 | 4 | 0 | 12 | 8 | 4 | 0 | 12 | 8 | 4 |
| | 13 | 0 | 13 | 10 | 7 | 4 | 1 | 14 | 11 | 8 | 5 | 2 | 15 | 12 | 9 | 6 | 3 |
| | 14 | 0 | 14 | 12 | 10 | 8 | 6 | 4 | 2 | 0 | 14 | 12 | 10 | 8 | 6 | 4 | 2 |
| | 15 | 0 | 15 | 14 | 13 | 12 | 11 | 10 | 9 | 8 | 7 | 6 | 5 | 4 | 3 | 2 | 1 |

METHOD OF SOURCE CODING AND HARMONIC CANCELLATION FOR VIBRATIONAL GEOPHYSICAL SURVEY SOURCES

BACKGROUND OF THE INVENTION

This invention relates to a method of coding signals from multiple geophysical vibrational energy sources used simultaneously in a geophysical seismic survey so that the seismic signals from each source can be separated in processing, at the same time providing for reduction of harmonic distortion and crossfeeding harmonics from the vibrational sources.

A common seismic survey method employs a single seismic source in conjunction with multiple geophone detector arrays arranged equally spaced along a line from the source. The source is activated a number of times in the same position, in order to improve the signal to noise ratio, and then the source and detector arrays are moved along the same line a short distance and the procedure repeated. This procedure is repeated along the predetermined length of the survey line and other designated survey lines in the area to be surveyed. The recorded data is then processed, usually by a digital computer at a headquarters processing department.

It is now common to use vibrational sources of seismic energy for seismic surveying. Typically, the energy is emitted in the form of a sweep of regularly increasing (upsweep) or decreasing (downsweep) frequency in the seismic frequency range. The vibrations are controlled by a control signal, which can control the frequency and phase of the seismic signals.

When only one seismic source is used, the survey procedure can be very time-consuming. With modern signal processing methods, the most expensive part of the seismic survey process has become the field survey period. This period could be shortened if more than one seismic source could be used simultaneously. However, multiple sources can only be used if some means for distinguishing between signals emanating from the different sources can be provided. Further, the vibrational source generates harmonics which, in certain circumstances, can have an energy approaching or even exceeding the fundamental, and which can crossfeed with signals from other sources, giving misleading results when the signals are processed to separate the signals from each source. In addition, the harmonics are a source of noise and can mask weak reflection signals from deeper layers.

U.S. Pat. No. 3,885,225 to Anstey et al proposes a method to distinguish between multiple sources. Anstey et al is directed to a method and apparatus for broadline seismic profiling, using several vibrators simultaneously emitting signals. The normal emission frequency bandwidth is divided into several parts which are allocated to individual vibrators in a sequence of separate emissions, in such a way that mutually exclusive frequencies are radiated by the several vibrators at any one time. The detected signals are separated on the basis of frequency to represent the individual signals from each vibrator. However, the frequency limitation on each individual vibrator reduces the sensitivity of the survey. Further, the '225 patent admits that harmonic distortion in the vibrators or their coupling with the ground can impair the capacity of the correlation process to separate the signals from different generators, but makes no attempt to remove or reduce this distortion.

Another method of separating signals from multiple vibratory sources using phase shifting of the signals on different sweeps is disclosed in U.S. Pat. No. 4,715,020 to Landrum. However, the problem of harmonic distortion and crossfeed is not even mentioned in this patent. On the other hand, U.S. Pat. No. 4,042,910 to Rietsch does provide a method of suppressing harmonics using phase shifting, but only for a single vibratory source. Obviously, when there is only one vibrator, crossfeed is not a problem, so this aspect of harmonic suppression is not even discussed by Rietsch.

A recent patent, U.S. Pat. No. 4,823,326 to Ward, does claim a method for producing separate seismic records derived from multiple, concurrently operated vibrational seismic sources, with reduced harmonic distortion. However, the specification only teaches how to achieve this result for two sources, and there is no clue as to how the method could be extended to more than two sources. The selection of suitable initial phase angles for the sources by trial and error, which appears to be what Ward used, becomes almost impossible with larger numbers of sources. For example, when four sources are used, with sixteen sweeps for each source, there are over 1800 possible combinations to be investigated. Further, Ward does not even mention the problem of crossfeed of the harmonics from one source into the signal from another source, and there is no teaching how to solve this problem.

SUMMARY OF THE INVENTION

This invention provides a method whereby the distortion and crossfeed from any harmonic order may be significantly reduced for any number of vibratory seismic sources operated concurrently, at the same time providing for signal separation and for signal-to-noise ratio improvement.

The method comprises determining the highest order harmonic which has sufficient signal strength to cause significant harmonic distortion of the sweep signals. The number of sweeps to be used is then selected, based on the number of sources and the degree to which it is desired to cancel harmonics. Initial phase angles for each sweep of each source are then selected so that substantially all harmonics up to and including the highest order harmonic determined to cause significant distortion are suppressed.

BRIEF DESCRIPTION OF THE DRAWINGS

FIG. 1 is a schematic field layout for a three dimensional seismic survey.

FIG. 2 is a schematic depiction of vertical seismic profiling.

FIG. 3 is a sample table used for the selection of suitable phase angle sequences for multiple sweeps by multiple seismic sources.

DETAILED DESCRIPTION OF THE INVENTION

One application for which the present invention is particularly useful is three dimensional seismic surveying. A field layout for this type of survey is shown schematically in FIG. 1. Seismic detectors 2 are spaced along a survey line 4. These detectors are preferably arrays of geophones. Energy source 6 is located on the survey line 4 at a distance from the nearest detector 2, and seismic energy sources 8, 10 of the same type as source 6, are located on either side of line 4, spaced apart from the line.

Another useful application for the present invention is vertical seismic profiling, shown schematically in FIG. 2. A tool 12 containing geophones is located in well bore 14, in contact with the geological stratum 16. Seismic energy sources 18 are located at the surface 20. Signals from the geophones are transmitted to the surface through leads 22.

The seismic energy sources used in this invention are of the well known type used in the Vibroseis method of seismic exploration. Vibrations are imparted to the earth in the survey area through a baseplate in contact with the surface, the frequency of the vibrations being controlled through a pilot signal produced by a programmable sweep generator. The sweep generator is normally programmed to provide a sweep of several seconds in which the frequency of the vibrations are steadily increased or decreased throughout the seismic frequency range, the amplitude of the vibrations remaining constant. It is necessary for this invention that the sweep generator is also capable of setting the starting phase angle for the sweep vibrations.

In the conventional Vibroseis survey, a single source is used, either a single vibrator, or several vibrators which operate identical sweeps simultaneously and which are placed close together. The geophones are laid out in the survey area, either along a single line or along multiple parallel lines. The source is often operated at several points along the survey line while maintaining the same geophone configuration. It is conventional to perform several sweeps in each source position and then stack the results in order to improve the signal to noise ratio.

When several different vibrational seismic sources are used simultaneously, the number of sweeps at each position must be at least the same as the number of sources in order to be able to separate the signals from each source during processing, a process known as source coding. However, in order for both source coding and cancellation of sweep harmonics according to the present invention to be carried out, the number of sweeps must be larger than the number of sources used. In order to carry out source coding and harmonic cancellation, a sequence of initial phase angles must be chosen for each sweep of each source which will ensure the separation of the signals and the cancellation those harmonics which are strong enough to affect the processing of the seismic data.

This invention provides a method of selecting suitable initial phase angles which can be used for any number of sources and any desired degree of harmonic cancellation. A sequence of phase angles is generated using the generator $m\phi$, where m is an integer, $$\phi = 2\pi/N$$

and N is the number of sweeps.

The choice of the number of sweeps depends in part upon the degree of harmonics which it is desirable to cancel. It is the general experience in seismic surveying with vibrational sources that the second and third harmonics are almost always troublesome. However, higher harmonics may cause serious problems in analyzing survey data, depending upon the elasticity of the surface layers at the location being surveyed. It is advantageous to carry out preliminary experiments before the survey begins to determine to what degree harmonics are troublesome and should therefore be cancelled or reduced by the practice of the present invention. The usual method of carrying out these experiments is to generate vibrations in a narrow frequency band, within the seismic frequency range, for example between 10 and 20 Hz, and look for frequencies higher than this band in the geophone traces, using spectral analysis. Several different narrow frequency bands, preferably slightly less than one octave wide, covering the whole seismic frequency range to be used in the survey, are swept independently. With this information, or information derived from similar experiments, those skilled in the art can determine which harmonics are a problem and should therefore be suppressed.

The choice of the number of sources to be used, as well as the number of data points to be stacked for signal-to-noise ratio improvement, which also affect the choice of the number of sweeps, are not within the scope of this invention and those skilled in the art are familiar with making those choices. In practice, it is common for the number of sweeps to be a power of two, although that is not necessary for the practice of this invention. The number of sweeps may also have to be limited for economic reasons, and those skilled in the art are well accustomed to making a trade-off between the cost of the survey and the accuracy of the data obtained.

Once the number of sources has been chosen and the desired degree of harmonic cancellation has been determined, an initial choice of a number of sweeps is made. This must be larger than the number of sources, and its size depends on the number of harmonics that are to be cancelled. For example, to cancel the first five harmonics with two sources, at least seven sweeps are required. This is because 2 through 5 times the generator for one source must not be equal to the generator for the other source, which itself cannot be zero.

Taking the number of sweeps chosen to be N, and the number of sources to be S, where S is less than N, a table having N rows and N columns is prepared. Designating the rows as H and the columns as M, each entry in the table is computed according to the following formula;

$$\text{entry} = e_{H,M} = (H)(M) \text{ modulo } N$$

Each entry in the first row represents a potential choice of m, and each column represents a possible sequence of $m\phi$ for a series of sweeps by a single source.

FIG. 3 shows the table when N=16. Each of columns 1 through 15 represents a possible sequence of phase angles for the sixteen sweeps. Row 1 represents m for the generating phase angle $m\phi$, for each of the sequences. The remaining rows within a given column represent the harmonic generators generated by a sweep sequence with that phase angle sequence. The initial phase angles may be chosen from the table so that the first harmonic which will crossfeed to the fundamental signal from all sources on that sweep is higher than the highest harmonic determined to be troublesome.

To give an example of the selection of a sequence of sweep phase angles according to the method of this invention, assume six sources are to be used and that it is desirable to suppress all harmonics below the 6th. A suitable initial choice of the number of sweeps would be 16. Using the table of FIG. 3, first examine the sequence in column 2 with initial phase angle $2\phi$ (given by the figure in row 1, 2 times $\phi$) for harmonics (represented by the entries in that column) that would interfere with the fundamental of that sequence. The second appearance of $2\phi$ is at row 9, which means that the first interfering harmonic is the 9th, well within the requirement of cancelling harmonics lower than the 6th. Thus column 2 is selected as potentially suitable phase sequence for the first source.

Looking down column 2, the harmonics below the 6th are generated by 4, 6 8 and $10\phi$, so we can eliminate these columns as suitable choices. Looking at column 3 as the next possible choice, the first appearance of m=2 is in row 6, indicating that the first harmonic to interfere with the choice of sequence for the first source is the 6th. This means that column 3 is a suitable choice of sequence, and that columns 6, 9, 12 and 15 can be eliminated. The next available sequence is that in column 5. As neither $2\phi$ nor $3\phi$ appear in that column above row 6, that is also a suitable choice of sequences, and columns 10, 15, 4 and 9 are eliminated. The next available column is 7, but that is not suitable because $5\phi$ appears at row 3 and $3\phi$ appears at row 5, indicating undesirable harmonic crossfeeds with both those sequences. The next available column is 11, which is acceptable because none of 2, 3 or $5\phi$ appear above row 6. This eliminates columns 6, 1, 12 and 7. Using the same criteria, columns 13 and 14 are acceptable, so six suitable sequences have been found.

If this process does not yield the same number of suitable sequences as the selected number of sources, a greater number of sweeps can be selected, a new table constructed and the same procedure followed, and the process repeated until a suitable number of sequences has been obtained. Alternatively, if this would cause the survey to be too expensive, fewer sources could be used, or fewer harmonics could be cancelled. Those skilled in the art are experienced in making such decisions.

The more sweeps that are used for each source in each position, the more expensive the survey becomes. It is an advantage of the present invention that it provides a means for determining the smallest number of sweeps needed to produce source signal separation and cancellation of those harmonics determined to be troublesome for any given number of sources.

A table is constructed as described above for $N=S+1$, i.e., having the number of rows and columns being one more than the chosen number of sources. Using the method described above, the table is examined to see whether it contains S suitable different phase sequences. If it does, then the minimum number of sweeps needed in each position of the sources is $S+1$. If it does not, a table for $N=S+2$ is constructed and similarly examined. If this does not yield S suitable different phase sequences, the process is repeated, increasing N by one each time until the first table containing S suitable different phase sequences is found. N for this table will be the minimum number of sweeps for each source in each position which will give the desired degree of harmonic cancellation for the given number of sources.

Preferably, this process is performed by a programmed digital computer. Programming to produce the tables from the given formula and to perform the searches is well within the capabilities of a programmer of ordinary skill in the art.

In performing seismic surveys, it is often desirable to move the sources at least once during the survey. For example, if it has been determined that a total of 16 sweeps is required to produce the desired signal-to-noise ratio improvement, the survey results are enhanced if the source is moved along the survey line two or more times between sweeps while performing that total number of sweeps. The advantage of the present invention is that it makes it possible to determine what is the minimum number of sweeps required in each position of the sources in order to give signal separation and the desired harmonic cancellation, so the maximum number of times the sources can be moved within the selected total number of sweeps can be determined.

Having selected the phase rotation in the above-described manner for the number of sources to be used in the survey, analysis of the geophone outputs to separate the signals for each source can be carried out by any conventional manner, such as the method of correlation and stacking taught in U.S. Pat. No. 4,715.020 to Landrum. Because the method of the present invention cancels all significant harmonic crossfeed and noise, processing of the data is straightforward and yields more accurate survey results.

Although preferred embodiments of the apparatus and method of the invention have been described, it will be apparent that a variety of modifications and changes may be made without departing from the invention.

What is claimed is:

1. In a seismic survey using multiple vibrational seismic energy sources which are activated concurrently in sweeps of constantly changing frequency within a seismic frequency range to generate seismic signals, a method of reducing harmonic distortion and crossfeed, comprising:
    (a) selecting the highest order harmonic which has sufficient signal strength to cause significant harmonic distortion of the sweep signals;
    (b) selecting the number of seismic energy sources to be used in the survey;
    (c) selecting a number of sweeps for each seismic energy source in excess of the number of seismic energy sources used;
    (d) selecting initial phase angles for each sweep of each seismic energy source so that substantially all harmonics up to and including said highest order harmonic are suppressed, wherein the step of selecting initial phase angles comprises:
        (i) constructing a table with N rows and N columns, where N is the number of sweeps, each entry $e_{H,M}$ being calculated from the formula $$e_{H,M} = H(M) \text{ modulo } N,$$

where H is the row number and M is the column number;
        (ii) selecting a number of columns equal to the number of sources such that the number in the first row of each selected column does not appear again in any selected column before the row $H=F+1$, where F is the highest order harmonic determined to cause significant crossfeed;
        (iii) assigning a selected column to each seismic energy source, the initial phase angle for the nth sweep of that seismic energy source being represented by the number in the nth row of that column multiplied by $2\pi/N$.

2. The method of claim 1 wherein the step of selecting the highest order harmonic includes operating the seismic energy source over a frequency band within the seismic frequency range and looking for frequencies above that band in the seismic signals.

3. The method of claim 2, wherein the width of the frequency band is about one octave.

4. The method of claim 2, wherein the width of the frequency band is less than one octave.

5. In a seismic survey using multiple vibrational seismic energy sources which are activated concurrently in sweeps of constantly changing frequency within a seismic frequency range to generate seismic signals, a method of selecting the minimum number of sweeps needed to provide signal separation and reduce harmonic distortion and crossfeed, comprising:
  (a) selecting the highest order harmonic which has sufficient signal strength to cause significant harmonic distortion of the sweep signals;
  (b) selecting the number of seismic energy sources to be used in the survey;
  (c) selecting a number of sweeps for each seismic energy source which is at least one greater than the number of seismic energy sources used;
  (d) determining whether it is possible to select initial phase angles for each of the selected number of sweeps for each seismic energy source so that substantially all harmonics up to and including said highest order harmonic are suppressed, wherein the step of determining whether it is possible to select initial phase angles comprises:
    (i) constructing a table with N rows and N columns, where N is the number of sweeps, each entry $e_{H,M}$ being calculated from the formula $$e_{H,M} = H(M) \text{ modulo } N$$

where H is the row number and M is the column number;
    (ii) finding all the columns in which the number in the first row of each selected column does not appear again in any selected column before the row $H = F+1$, where F is the highest order harmonic determined to cause significant crossfeed,
    (iii) if the number of columns found in step (ii) is less than the selected number of seismic energy sources, repeating steps (i) and (ii) increasing N by one each time until a table which contains at least as many columns found by step (ii) as the selected number of seismic energy sources,
  (e) if it is not possible to select such initial phase angles for each of the selected number of sweeps, selecting a number of sweeps which is one greater than the previously selected number of sweeps and determining whether it is possible to select initial phase angles for each of the greater number of sweeps for each seismic energy source so that substantially all harmonics up to an including said highest order harmonic are suppressed, and
  (f) repeating step (e) as necessary until the lowest number of sweeps for which it is possible to select initial phase angles for each of the greater number of sweeps for each seismic energy source so that substantially all harmonics up to and including said highest order harmonic are suppressed is found.

6. The method of claim 5, wherein the step of selecting the highest order harmonic includes operating the seismic energy source over a frequency band within the seismic frequency range and looking for frequencies above that band in the seismic signals.

7. The method of claim 6, wherein the width of the frequency band is about one octave.

8. The method of claim 6, wherein the width of the frequency band is less than one octave.

* * * * *